(12) United States Patent
Sun et al.

(10) Patent No.: US 8,660,737 B2
(45) Date of Patent: Feb. 25, 2014

(54) VEHICLE HANDLING ASSISTANT APPARATUS

(75) Inventors: Chong Sun, Shanghai (CN); Guanglin Ma, Shanghai (CN); Ran Li, Shanghai (CN)

(73) Assignee: Delphi Technologies, Inc., Troy, MI (US)

( * ) Notice: Subject to any disclaimer, the term of this patent is extended or adjusted under 35 U.S.C. 154(b) by 304 days.

(21) Appl. No.: 13/202,817

(22) PCT Filed: Mar. 24, 2010

(86) PCT No.: PCT/US2010/028383
§ 371 (c)(1),
(2), (4) Date: Aug. 23, 2011

(87) PCT Pub. No.: WO2010/114747
PCT Pub. Date: Oct. 7, 2010

(65) Prior Publication Data
US 2011/0307176 A1 Dec. 15, 2011

(30) Foreign Application Priority Data

Mar. 30, 2009 (CN) ...................... 2009 2 0008222 U (51) Int. Cl.
*G08G 1/16* (2006.01)
(52) U.S. Cl.
USPC .............. 701/28; 701/300; 701/301; 348/169

(58) Field of Classification Search
USPC ............... 701/28, 41, 300, 301; 348/148, 169
See application file for complete search history.

(56) References Cited

U.S. PATENT DOCUMENTS

| 5,136,658 | A | 8/1992 | Mori |
| 5,633,705 | A | 5/1997 | Asayama |
| 6,115,651 | A * | 9/2000 | Cruz ................................. 701/1 |
| 6,211,784 | B1 * | 4/2001 | Nishide ...................... 340/568.1 |
| 6,834,254 | B2 * | 12/2004 | Sekiguchi ..................... 702/158 |
| 2001/0026317 | A1 | 10/2001 | Kakinami et al. |
| 2006/0287825 | A1 | 12/2006 | Shimizu et al. |

* cited by examiner

*Primary Examiner* — Richard Camby
(74) *Attorney, Agent, or Firm* — J. Gordon Lewis (57) ABSTRACT

A vehicle handling assistant apparatus is discloses, the vehicle handling assistant apparatus utilizes an environment acquisition means to acquire an environment signal and utilizes an environment presentation means to present the environment signal. The vehicle handling assistant apparatus also utilizes an obstacle detection means to detect an obstacle from the environment signal acquired by the environment acquisition means and output an obstacle signal. The obstacle detection means may be implemented by an infrared sensor, a radar sensor, an ultrasonic sensor or a camera. An obstacle region generation means generates an obstacle region signal from the environment signal based on the obstacle signal generated by the obstacle detection means. The obstacle region signal includes information about a position of the foot point line and a width of the obstacle region. An environment signal adjustment means adjusts the environment signal presented by the environment presentation means based on the obstacle region signal.

11 Claims, 7 Drawing Sheets

VEHICLE HANDLING ASSISTANT APPARATUS

CROSS REFERENCE TO RELATED APPLICATIONS

This application claims the benefit under 35 U.S.C. §371 of PCT Patent Application Number PCT/US2010/28383, filed Mar. 24, 2010, and China Utility Application No. 200920008222.2, filed Mar. 30, 2009, the entire disclosure of which is hereby incorporated herein by reference.

FIELD OF THE INVENTION

The present disclosure relates to automobile parts, more particularly, relates to a vehicle handling assistant apparatus.

BACKGROUND

Vision based vehicle handling assistant devices, particularly those providing a parking assist function including a rear view camera system are well known and widely applied in the automotive industry.

However, known vision vehicle handling assistant devices have some drawbacks. For example, the vision vehicle handling assistant device may present a predicted moving track of the vehicle on a display, the moving track is rendered in different colors to indicate different distances. The moving track is drawn in opaque lines on an environment image, that is, if an object, such as an obstacle appears in the environment image, the moving track and the obstacle directly overlap. Such an overlay makes the images appear unnatural, and the function of indication of the distance, which is an important function of the moving track is attenuated. The opaque lines of the moving track cover the image of the obstacle, the observation of the driver is interfered and the correct distance is hard to determine.

Figure 6A:
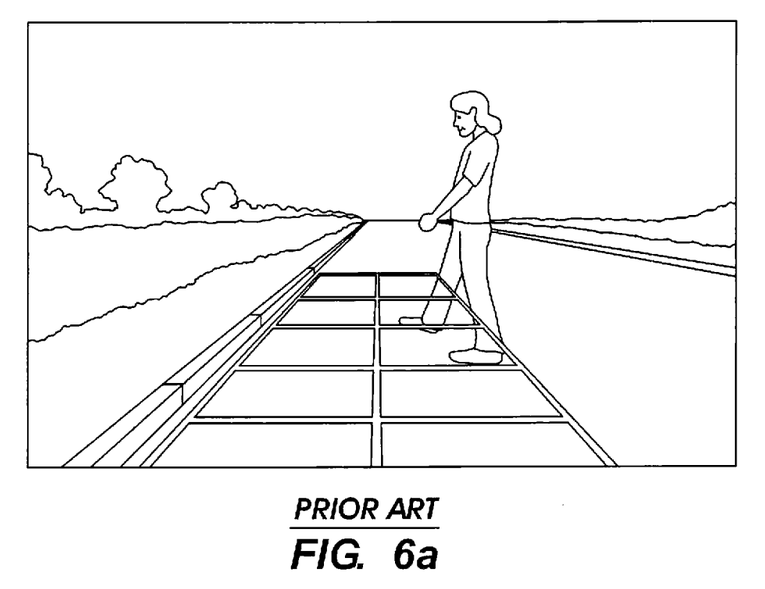
Figure 6B:
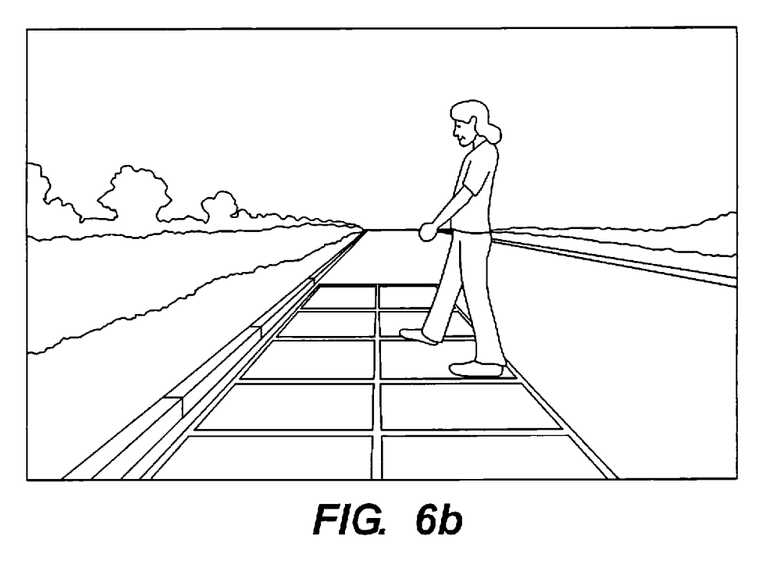
FIG. 6b, illustrates a corresponding image presented according the present disclosure.

FIG. 6a shows an image presented by a popular vision vehicle parking assistant devices. When an obstacle (a pedestrian) appears behind the vehicle, a predicted moving track (composed of vertical and horizontal lines) and the image of the obstacle overlap. Since both the moving track and the obstacle are opaque, the presented image looks unreal, and it is also difficult to correctly estimate a distance.

Figure 7A:
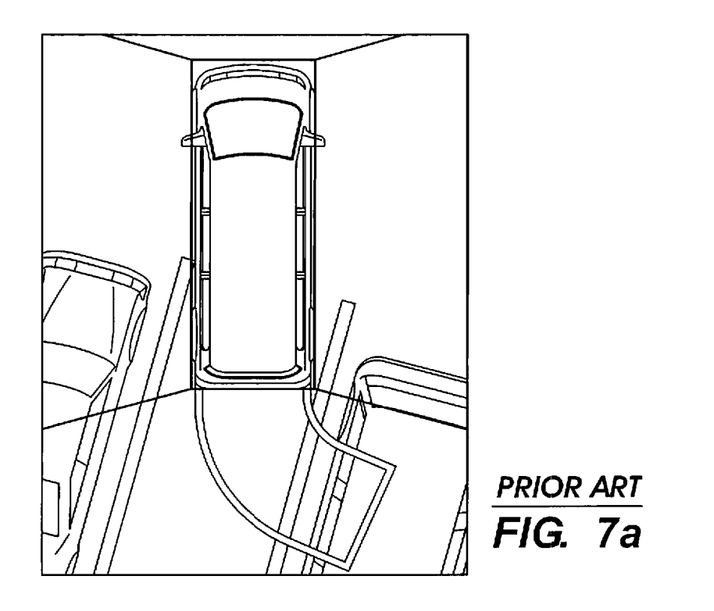
FIG. 7a, illustrates a bird's-eye view image of a vision vehicle parking assistant device in prior art.
Figure 7B:
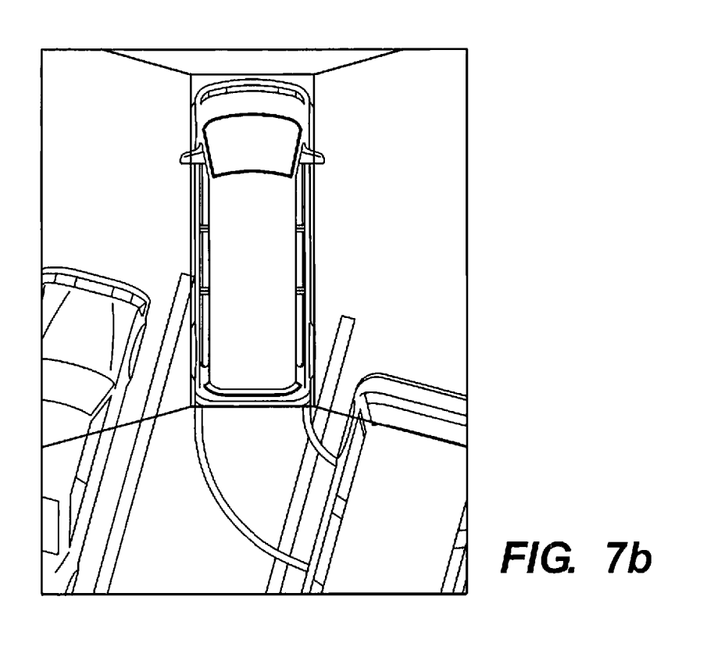
FIG. 7b, illustrates a corresponding bird's-eye view image presented according the present disclosure.
Figure 8A:
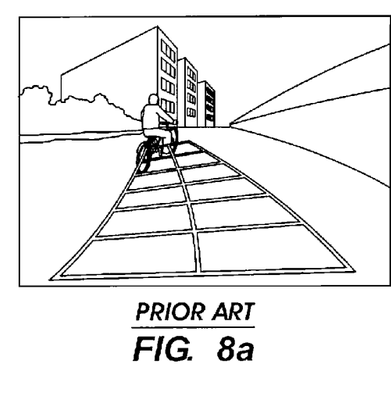
FIG. 8a, illustrates a predicted moving track in prior art.
Figure 8B:
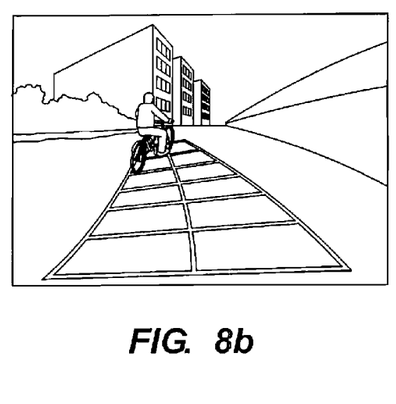
FIG. 8b, illustrates a corresponding predicted moving track presented according to the present disclosure.
Figure 9A:
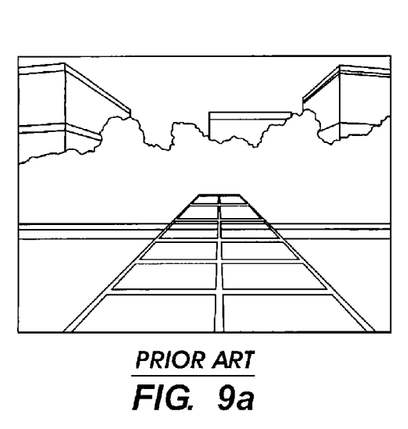
FIG. 9a, illustrates another predicted moving track in prior art.
Figure 9B:
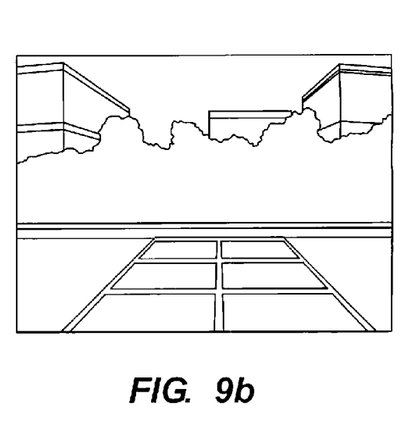
FIG. 9b, illustrates a corresponding predicted moving track according to the present disclosure.

FIG. 7a is an image presented by another kind of vision vehicle parking assistant devices. This is a bird's-eye view parking assistant device, however, the problem still exists, a predicted moving track and an obstacle (another vehicle) overlap.

SUMMARY

Embodiments of the present disclosure provide a vehicle handling assistant apparatus which may detect an obstacle and adjust a predicted moving track according to the detected obstacle.

According to an embodiment, a vehicle handling assistant apparatus utilizes an environment acquisition means to acquire an environment signal and utilizes an environment presentation means to present the environment signal. The vehicle handling assistant apparatus also utilizes an obstacle detection means to detect an obstacle from the environment signal acquired by the environment acquisition means and output an obstacle signal. The obstacle detection means may be implemented by an infrared sensor, a radar sensor, an ultrasonic sensor or a camera. According to an embodiment, the obstacle detection means comprises a camera and detects an obstacle based on large differences between corresponding areas of consecutive video frames, or detects an obstacle based on video frames which are colored. An obstacle region generation means generates an obstacle region signal from the environment signal based on the obstacle signal generated by the obstacle detection means. The obstacle region signal includes information about a position of the foot point line and a width of the obstacle region. An environment signal adjustment means adjusts the environment signal presented by the environment presentation means based on the obstacle region signal.

According to an embodiment, the environment signal adjustment means presents a predicted moving track of the vehicle. For the purpose of accuracy, both a moving track on ground and a moving track at a height of the rear structure of the vehicle are presented. According to an embodiment, the environment signal adjustment means may opaquely or transparently present the moving track on ground and the moving track at a height of the rear structure of the vehicle upon an obstacle region, or does not present the moving tracks.

The vehicle handling assistant apparatus detects an obstacle from the environment signal and adjusts the presentation of predicted moving tracks within a detected obstacle region. A "real overlay" effect is obtained for the predicted moving tracks and the obstacles, drivers may have a more accurate determination of the environment and distance based on the apparatus.

BRIEF DESCRIPTION OF THE DRAWINGS

The above or other features, natures or advantages of the present disclosure will be more obvious to the skilled person in the art by the following descriptions of the embodiments accompanying with the drawings, the same sign reference indicates the identical features throughout the description, and wherein:

For the purpose of facilitating the understanding of the present disclosure, FIGS. 6a-9b are provided for reference. These figures show the images of the vision vehicle parking assistant devices, indicative of the differences in presentation of the predicted moving tracks between the present disclosure and the prior art.

FIG. 6a illustrates an image of a vision vehicle parking assistant device in prior art.

DETAILED DESCRIPTION

Figure 1:
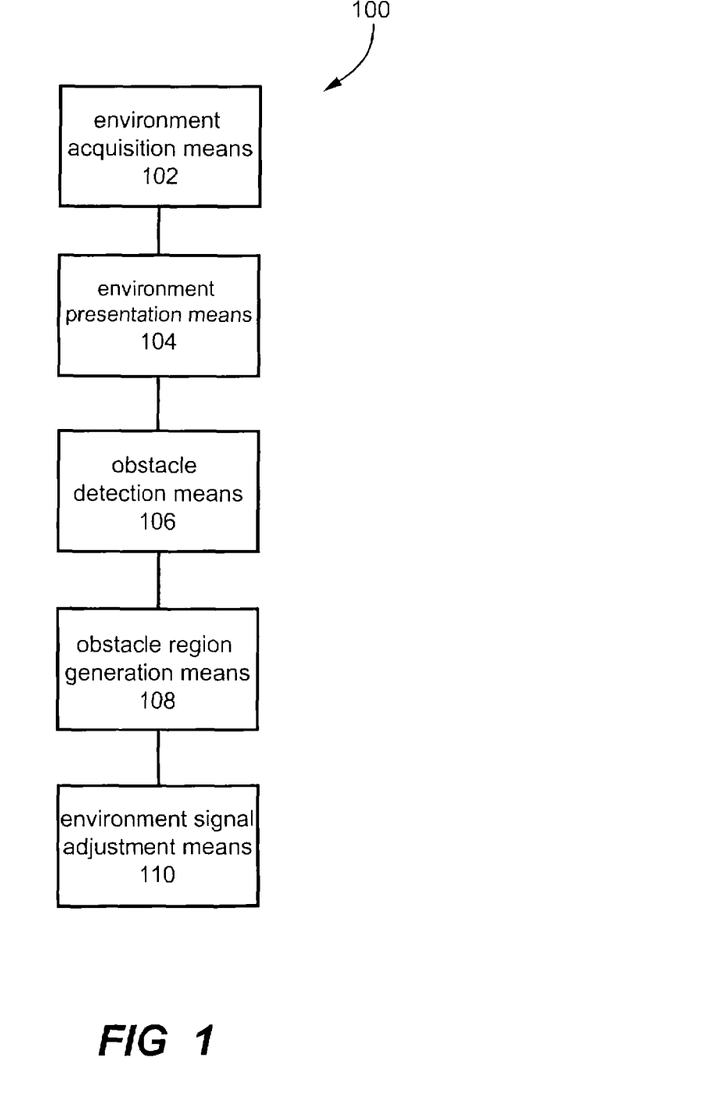
FIG. 1, illustrates a structural diagram of a vehicle handling assistant apparatus according to an embodiment of the present disclosure.

As shown in FIG. 1, a vehicle handling assistant apparatus 100 according to an embodiment is provided. The apparatus 100 comprises an environment acquisition means 102, an environment presentation means 104, an obstacle detection means 106, an obstacle region generation means 108 and an environment signal adjustment means 110.

The environment acquisition means 102 operates to acquire an environment signal. The environment acquisition means may be implemented by a camera.

The environment presentation means 104 operates to provide the environment signal. The environment presentation means may be implemented by an operator display.

The obstacle detection means 106 operates to detect an obstacle from the environment signal acquired by the environment acquisition means and output an obstacle signal. The obstacle detection means 106 may detect the obstacle through various methods, for example, the obstacle detection means may be implemented by one of the following: an infrared sensor, a radar sensor, an ultrasonic sensor or a camera. For the drivers, visual signals shall be the most intuitive signal, so cameras are widely applied. The Camera is used as an example of the obstacle detection means in the following description. A obstacle detection means using a camera may include a motion detection means or a color detection means.

The motion detection means operates to detect an obstacle based on large differences between corresponding areas of consecutive video frames. A process of detection is described herebelow.

Obtain an original frame;

Compute a theoretical optical flow for the original frame;

Combine the original frame by the theoretical optical flow to generate a shifted frame;

Compare the shifted frame with the original frame;

Set a threshold and compare the shifted frame with the original frame pixel by pixel. For each pixel, determine a scale difference between the shifted frame and the original frame, set the pixels which have a scale difference not smaller than the threshold to be "1", and the pixel which have a scale difference smaller than the threshold to be "0". If an area dramatically changes between consecutive frames, the area may correspond to an obstacle. The shifted frame and the original frame may be regarded as "consecutive frames", and an obstacle shall be detected through a comparison of the shifted frame and the original frame.

For the obstacle signal outputted by the motion detection means, the pixels indicated as "1" may represent an obstacle, and the pixels indicated as "0" do not represent an obstacle.

The color detection means detects an obstacle based on color difference. A coloration means shall be used together with the color detection means, the coloration means colors the video frames and the color detection means detects an obstacle based on the colored video frames.

A process of color detection is described herebelow.

The coloration means colors the video frame, the coloration is performed based on a ground plan color model.

After the coloration, the video frame is colored to be a ground area and a non-ground area.

Filter the non-ground area based on a predetermined threshold, set the pixels which have a scale not smaller than the threshold to be "1", and the pixels which have a scale smaller than the threshold to be "0". The pixels indicated by "1" in the non-ground area may represent an obstacle.

For the obstacle signal outputted by the color detection means, the pixels indicated as "1" may represent an obstacle, and the pixels indicated as "0" do not represent an obstacle.

For the obstacle signal outputted by the obstacle detection means 106, whatever the motion detection means or the color detection means is used, the pixels indicated as "1" may represent an obstacle, and the pixels indicated as "0" do not represent an obstacle.

Figure 2:
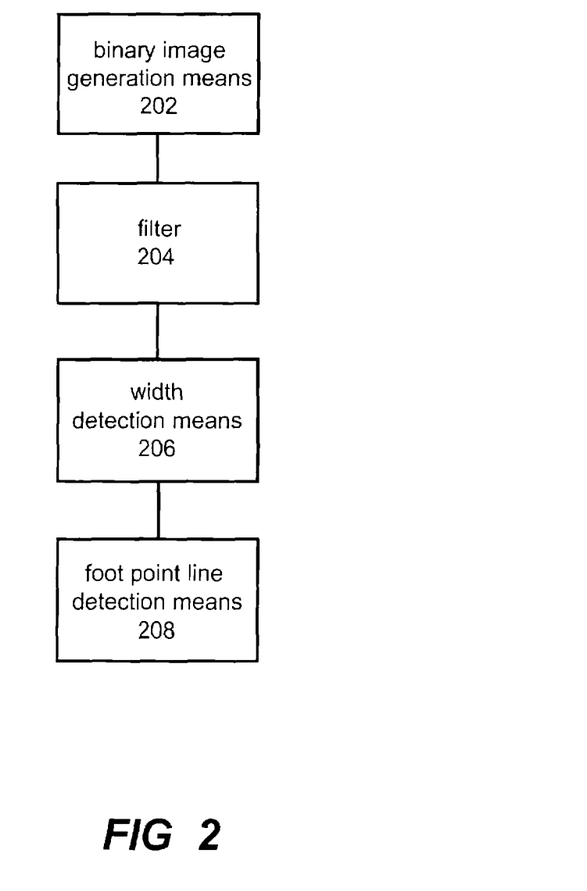
FIG. 2, illustrates a structural diagram of an obstacle region generation means according to an embodiment of the present disclosure.

The obstacle region generation means 108 generates, after obtains the obstacle signal, an obstacle region signal from the environment signal based on the obstacle signal generated by the obstacle detection means 106. As shown in FIG. 2, according to an embodiment, the obstacle region generation means 108 includes a binary image generation means 202, a filer 204, a width detection means 206 and a foot point line detection means 208.

The binary image generation means 202 generates a binary image from a video signal frame based on the obstacle signal. In the binary image, pixels in the areas corresponding to the detected obstacle are set to be "1", pixels in other areas are set to be "0".

The filter 204 filters the binary image and removes noises from the binary image. Some fragmentary or small "1" areas may be formed by noises, the filter 204 is used to remove these noises.

The width detection means 206 detects a width of the obstacle region within the binary image, the width of the obstacle region means the dimension of the widest part of the "1" area in the binary image.

The foot point line detection means 208 detects a foot point line of the obstacle region within the binary image, the foot point line means the position of the lowest point of the "1" area in the binary image.

Figure 3:
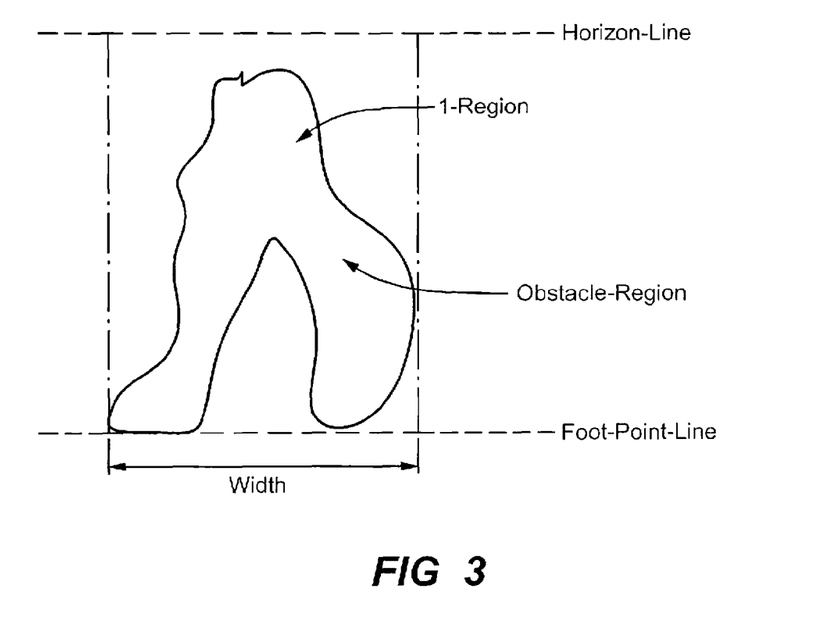
FIG. 3, illustrates an exemplary process of generation of the obstacle region signal according to an embodiment.

FIG. 3 illustrates an exemplary process of generation of the obstacle region signal according to an embodiment. As shown in FIG. 3, the area within the solid line is the area of pixel "1", this area is indicated as "1-Region" and represent an obstacle. "Width" means the width of the obstacle region, which is the dimension of the widest part of "1" area. The lowest point in "1" area is the position of the foot point line. The foot point line is a line parallel to the horizon line, which is denoted as "Horizon-Line" and is denoted as "Foot-Point-Line". At the ends of "Width", two vertical lines are made from the "Foot-Point-Line" to the "Horizon-Line", these two lines are perpendicular to the "Foot-Point-Line" and the "Horizon-Line". The area defined by the two vertical lines, the "Foot-Point-Line" and the "Horizon-Line" is the obstacle region and is denoted as "Obstacle-Region". The obstacle region generation means 108 generates an obstacle area signal indicative of the "Obstacle-Region".

Figure 4:
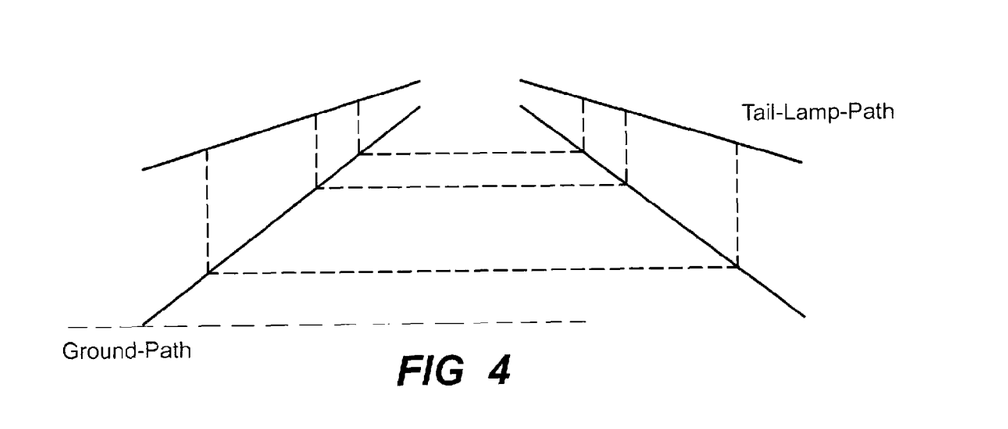
FIG. 4, illustrates an exemplary presentation of the predicted moving track according to an embodiment.

The environment signal adjustment means 110 adjusts the environment signal presented by the environment presentation means 104 based on the obstacle region signal. According to an embodiment, the environment signal adjustment means 110 comprises a track presentation means for presenting a predicted moving track of the vehicle upon the environment signal. Though the vision parking assistant device in prior art also provides a predicted moving track, only a predicted moving track on ground is provided. In actual implementations, the obstacle usually has a height, so only a predicted moving track on ground is not sufficient, a collision or scrape may occur on a relatively high position. According to an embodiment, the track presentation means may provide two predicted moving tracks, one is a moving track on ground and the other is a track at a particular height of the rear structure of the vehicle. For example, a ground track presentation means may be used for presenting a moving track on ground upon the environment signal and a raised track presentation means may be used for presenting a moving track at a height of the rear structure of the vehicle based on the environment signal. The moving track at a height of the rear structure of the vehicle may be a moving track at a height of the rear lights of the vehicle. FIG. 4 illustrates an exemplary presentation of the predicted moving track according to an embodiment. As shown in FIG. 4, the lower lines (denoted as Ground-Path) represent the moving track on ground, the upper lines (denoted as Tail-Lamp-Path) represent the raised moving track.

The environment signal adjustment means 110 provides the following kinds of presentations for the predicted moving tracks which extend to the obstacle region: an opaque presentation, a transparent presentation and a real presentation.

Figure 5A:
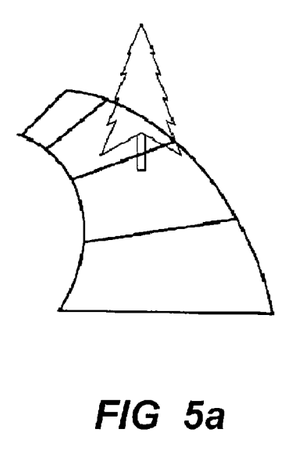
FIGS. 5a, 5b and 5c, illustrate the different kinds of presentations of the moving track within the obstacle region.

The opaque presentation is implemented by the opaque presentation means. In the opaque presentation, the predicted moving track of the vehicle is presented with opaque lines over the obstacle region and no more action is taken on the overlay. The opaque presentation may be regarded as a manner similar to the presentation in prior art. FIG. 5a shows the opaque presentation.

Figure 5B:
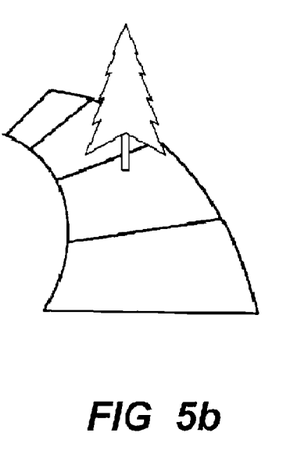

The transparent presentation is implemented by a transparent presentation means. In the transparent presentation, the predicted moving track of the vehicle is presented with transparent lines over the obstacle region. The moving track is displayed transparently, or be faded. FIG. 5b shows the transparent presentation.

Figure 5C:
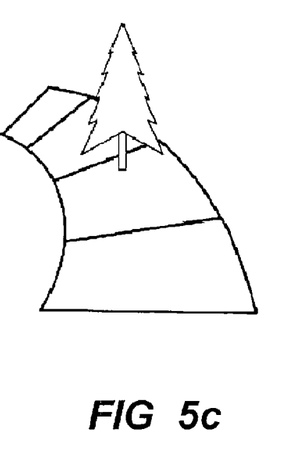

The real presentation is implemented by an real presentation means. In the real presentation, the obstacle will occlude the moving track which passes through the obstacle. A "real overlay" effect is obtain in real presentation. FIG. 5c shows the transparent presentation.

It should be noted that the environment signal adjustment means 110 may include one or more of the opaque presentation means, the transparent presentation means and the real presentation means, or the environment signal adjustment means 110 may include a device which may implement the opaque presentation, the transparent presentation and the real presentation.

If the transparent presentation or the real presentation is used, a "real overlay" effect may be obtained for the predicted moving track and the obstacle, which may facilitate the drivers to observe the environment and the estimate the distance more accurately.

FIGS. 6a and 6b, 7a and 7b, 8a and 8b, and 9a and 9b, respectively illustrate the differences on presentation between the predicted moving tracks in prior art and the predicted moving track according to the present disclosure.

As a conclusion, the vehicle handling assistant apparatus detects an obstacle from the environment signal and adjusts the presentation of predicted moving tracks within a detected obstacle region. A "real overlay" effect is obtained for the predicted moving tracks and the obstacles, drivers may have a more accurate determination of the environment and distance based on the apparatus.

The previous description of the disclosed embodiments is provided to enable any person skilled in the art to make or use the present invention. Various modifications to these embodiments will be readily apparent to those skilled in the art and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A vehicle handling assistant apparatus, comprising an environment acquisition means for acquiring an environment signal and an environment presentation means for presenting the environment signal, wherein the apparatus further comprises:
    an obstacle detection means for detecting an obstacle from the environment signal acquired by the environment acquisition means and outputting an obstacle signal;
    an obstacle region generation means for generating an obstacle region signal and an obstacle region image from the environment signal based on the obstacle signal generated by the obstacle detection means, said obstacle region image limited to a vertical range extending between ground level and a maximum height of the rear structure of said vehicle; and
    an environment signal adjustment means for adjusting the environment signal presented by the environment presentation means based on the obstacle region signal.

2. The apparatus of claim 1, wherein the obstacle detection means is one of the following:
    an infrared sensor, a radar sensor, an ultrasonic sensor or a camera.

3. The apparatus of claim 2, wherein the obstacle detection means comprises a camera, and the obstacle detection means further comprises:
    a motion detection means for detecting an obstacle based on large differences between corresponding areas of consecutive video frames;
    a coloration means for coloring the video frames and a color detection means for detecting an obstacle based on the colored video frames.

4. The apparatus of claim 1, wherein the obstacle region generation means comprises:
    a binary image generation means for generating a binary image based on the obstacle signal;
    a filter for removing noises from the binary image;
    a width detection means for detecting a width of the obstacle region within the binary image based on the obstacle signal;
    a foot point line detection means for detecting a foot point line of the obstacle region within the binary image based on the obstacle signal.

5. The apparatus of claim 1, wherein the environment signal adjustment means comprises a track presentation means for presenting a predicted moving track of the vehicle upon the environment signal.

6. The apparatus of claim 5, wherein the track presentation means comprises:
    a ground track presentation means for presenting a moving track on ground upon the environment signal;
    a raised track presentation means for presenting a moving track at a height of the rear structure of the vehicle based on the environment signal.

7. The apparatus of claim 5, wherein raised track presentation means presents a moving track at a height of the rear lights of the vehicle.

8. The apparatus of claim 5, wherein the environment signal adjustment means further comprises:
    an opaque presentation means for presenting the predicted moving track of the vehicle with opaque lines over the obstacle region.

9. The apparatus of claim 5, wherein the environment signal adjustment means further comprises:
    a transparent presentation means for presenting the predicted moving track of the vehicle with transparent lines over the obstacle region.

10. The apparatus of claim 5, wherein the environment signal adjustment means further comprises:
  a real presentation means for presenting the predicted moving track of the vehicle with real views over the obstacle region.

11. A vehicle handling assistant apparatus, comprising:
  environment acquisition means including sensors having a fixed field of view external of said vehicle operative to generate an environment signal as a function of images received from said sensors;
  an environment display device operative to present the environment signal to a vehicle operator;
  obstacle detection means operative to process said environmental signal to detect an obstacle appearing within said field of view and outputting an obstacle signal in response thereto;
  obstacle region generation means operative to process said obstacle signal and to generate an obstacle region image as a function of the environment signal based on the obstacle signal generated by the obstacle detection means, said obstacle region image limited to a vertical range extending between ground level and a maximum height of the rear structure of said vehicle; and
  environment signal adjustment means operative to:
  generate a signal depicting a moving track of said vehicle as a function of vehicle operating parameters anticipative of impending vehicle motion,
  electronically superimposing an image of said moving track on said environmental display, and occluding any portion of the moving track image positionally registering with said obstacle region image.

* * * * *